United States Patent
Kassai et al.

(10) Patent No.: US 6,893,088 B2
(45) Date of Patent: May 17, 2005

(54) CHILD SEAT FOR AUTOMOBILE

(75) Inventors: Kenzou Kassai, Osaka (JP); Keiji Inoue, Osaka (JP); Atsuyoshi Yoshida, Osaka (JP)

(73) Assignee: Aprica Kassai Kabushikikaisha, Osaka (JP)

( * ) Notice: Subject to any disclaimer, the term of this patent is extended or adjusted under 35 U.S.C. 154(b) by 0 days.

(21) Appl. No.: 10/606,673

(22) Filed: Jun. 26, 2003

(65) Prior Publication Data

US 2004/0004379 A1 Jan. 8, 2004

(30) Foreign Application Priority Data

Jul. 8, 2002 (JP) .................................. 2002-235248
May 16, 2003 (JP) .................................. 2003-138614

(51) Int. Cl.[7] ................................................ A47C 1/08
(52) U.S. Cl. ................................. 297/250.1; 297/488
(58) Field of Search ..................... 297/256.15, 250.1, 297/467, 488, 487

(56) References Cited

U.S. PATENT DOCUMENTS

| 4,342,483 A | | 8/1982 | Takada |
| 4,591,208 A | | 5/1986 | McDonald et al. |
| 4,632,460 A | | 12/1986 | Meeker |
| 4,688,849 A | * | 8/1987 | Tsuge et al. ............ 297/256.15 |
| 4,826,246 A | | 5/1989 | Meeker |
| 4,886,315 A | | 12/1989 | Johnson |
| 5,061,012 A | * | 10/1991 | Parker et al. ................ 297/467 |
| 5,181,765 A | * | 1/1993 | Glover ........................ 297/467 |
| 5,368,328 A | | 11/1994 | Kamiyama et al. |
| D369,474 S | * | 5/1996 | Slichter et al. ............... D6/333 |
| 5,549,356 A | * | 8/1996 | Gray ...................... 297/256.15 |
| 5,683,138 A | * | 11/1997 | Ward et al. ............. 297/256.15 |
| 5,758,582 A | | 6/1998 | Gnezdilov |
| 5,779,304 A | | 7/1998 | Cunningham |
| D427,785 S | * | 7/2000 | Kassai .......................... D6/333 |
| 6,398,302 B1 | * | 6/2002 | Freedman et al. ........ 297/250.1 |
| 6,637,341 B2 | * | 10/2003 | Kroon et al. .................. 104/53 |
| 2001/0028186 A1 | | 10/2001 | Kosugi et al. |

FOREIGN PATENT DOCUMENTS

| DE | GM7918120 | 9/1979 |
| DE | 40338648 | 5/1991 |
| EP | 0709264 | 5/1996 |
| GB | 2238717 | 6/1991 |
| JP | 2001213206 | 8/2001 |
| WO | WO91/12978 | 9/1991 |

* cited by examiner

*Primary Examiner*—Milton Nelson, Jr.
(74) *Attorney, Agent, or Firm*—W. F. Fasse; W. G. Fasse

(57) ABSTRACT

A child car seat comprises a seat body including a seat wall and a backrest wall, and a V-shaped shield structure extending from above both shoulders to a crotch of a child. The V-shaped shield structure includes a belt extending in the shape of the letter V, a belt guiding member guiding the belt and an elastic cover surrounding the belt guiding member.

18 Claims, 13 Drawing Sheets

CHILD SEAT FOR AUTOMOBILE

BACKGROUND OF THE INVENTION

1. Field of the Invention

The present invention relates to a child car seat mounted on a seat of a car and more particularly, to a structure for restraining a child seated therein.

2. Description of the Background Art

As a child car seat, there are a juvenile seat for children from 9 months old to a school age (about 11 years old) and an infant seat for babies. According to the infant seat, a baby is restrained by a belt mounted on the infant seat. Meanwhile, according to the juvenile seat, a child is restrained by a shield member provided in front of the child seated or by a seat belt mounted on the car.

According to the juvenile seat disclosed in Japanese Patent Laying-Open Gazette No. 2001-213206, there is provided a shield member which surrounds an abdomen and legs of a child seated from the front and both sides. In the event of a crash at the front of the car, the shield member prevents the child from getting out forwardly.

According to the conventional juvenile seat provided with the shield member, although the child can be prevented from getting out forwardly at the time of the crash at the front of a car, protection for the child is not sufficient at the time of crash at the side of the car. Especially, in case of the juvenile seat in a state where a head of the child is not protected, there is a fear that a temporal region of the head will be hit hard in the event of the crash at the side of the car because the shield member cannot effectively prevent the child from getting out upwardly. Thus, when the car falls on its side, for example, there is a fear that the child will get out of the juvenile seat upwardly.

In case of the infant seat for babies, it should avoid the baby from being hanged. Since a shoulder belt mounted on the infant seat can be drawn out forwardly when it is pulled softly, there is a fear that the head of the baby will pass through the shoulder belt and be hanged.

SUMMARY OF THE INVENTION

The present invention was made to solve the above problems and it is an object of the present invention to provide a child car seat which can safely protect a seated child.

A child car seat according to the present invention comprises a seat body including a seat wall and a backrest wall, and a V-shaped shield structure downwardly extending from above both shoulders of a child to restrain a body of the child seated in the seat body.

The V-shaped shield structure can effectively prevent the child from getting out forwardly and upwardly. In addition, in the event of a crash at the side of a car, the V-shaped shield structure can effectively stop movement of a head of the child to the side. Furthermore, since the V-shaped shield structure is rigid, it is not necessary to worry about a case where the head passes through it.

According to one embodiment of the present invention, the V-shaped shield structure extends to a crotch of the child. In this case for example, the V-shaped shield structure includes a back surface abutting part which is kept connected to the backrest wall of the seat body and a seat surface abutting part which can be separated from the seat wall. Preferably, the child car seat further comprises a buckle for detachably connecting the seat surface abutting part of the V-shaped shield structure to the seat wall of the seat body.

According to one embodiment of the present invention, the V-shaped shield structure includes a belt extending in the shape of the letter V, a belt guiding member for guiding the belt and an elastic cover surrounding the belt guiding member. The elastic cover gives the seated child a soft touch.

Preferably, the elastic cover includes a shoulder protector part extending in the almost horizontal direction over both shoulders of the child seated in the seat body. The elastic shoulder protector part extending in the horizontal direction works so as to fixedly hold both shoulders of the child while reducing any impact to then.

According to one embodiment of the present invention, the elastic cover includes a pair of side projections projecting toward a waist part of the child seated in the seat body. Since such side projections are provided, the position of the waist of the seated child can be stably fixed.

Preferably, the elastic cover has a concave portion at a part with which a vital or genitel zone of a boy seated in the seat body comes in contact.

Typically, the elastic cover is formed of bead foam. The bead foam is elastic and has a function to absorb small impact force. Therefore, it can give the child a soft touch.

In addition, typically, the belt guiding member is formed of blow-molded resin. If the V-shaped shield structure includes the belt, the belt guiding member formed of blow-molded resin, and the elastic cover formed of bead foam, the structure can be cut in by a cutter. Thus, the child can be made to escape by cutting the V-shaped shield structure in the event of an emergency.

According to one embodiment of the present invention, the seat body includes a pair of side walls forwardly projecting from both sides of the backrest wall. Each side wall has a notch at its forward portion and an opening at its backward portion. A seat belt mounted on a car passes through the notch or the opening.

According to one embodiment of the present invention, the child car seat comprises a frame assembly for supporting the seat body. The frame assembly includes a pair of L-shaped frames extending along both sides of the backrest wall and the seat wall of the seat body, an upper connection metal rod for connecting upper portions of the pair of L-shaped frames, and a lower connection rod for connecting lower portions of the pair of L-shaped frames. The belt extending in the shape of the letter V winds around the upper connection metal rod and is connected to the lower connection rod. In this structure, an impact load affects the upper connection metal rod. Therefore, in the event of a car crash, the upper connection metal rod deforms in a plastic manner and absorbs the impact force to some extent.

According to one embodiment of the present invention, the child car seat comprises a frame assembly for supporting the seat body. The frame assembly includes a pair of L-shaped frames extending along both sides of the backrest wall and the seat wall of the seat body, upper and lower reinforcement frames for connecting an extending part in the vertical direction to an extending part in the horizontal direction of each of the L-shaped frames. The upper reinforcement frame supports a belt supporting surface provided in the notch of each of the side walls from beneath and the lower reinforcement frame supports a belt supporting surface provided in the opening of each of the side walls from beneath. In this structure, the upper and lower reinforcement frames reinforce the structure of the assembly and also increases the strength of the belt supporting surface.

According to another embodiment of the present invention, the child car seat further comprises a crotch pad upwardly extending from the seat wall of the seat body to a crotch of the child and a buckle for detachably connecting lower end of the V-shaped shield structure to the crotch pad. Instead of the crotch pad, a crotch belt may be provided. Alternatively, the crotch pad and the crotch belt may be coupled.

Preferably, the crotch pad comprises a pair of side projections projecting toward a waist part of the child seated in the seat body. Preferably, the child car seat further comprises connecting means for detachably connecting the crotch pad to the seat wall of the seat body.

According to A further embodiment of the present invention, the child car seat further comprises a belt connected to the V-shaped shield structure, passing a back surface of the backrest wall, passing the seat wall and being drawn out to a front end of the seat wall, and a lock member provided at the front end of the seat wall to prohibit movement of the belt.

When the child grows up, the V-shaped shield structure is removed from the seat body. In this case, the body of the child is restrained by using the seat belt mounted on the car. In the embodiment comprising the crotch pad, the crotch pad may remain being mounted on the seat body. In this case, the crotch pad preferably comprises shoulder belt guiding means for guiding a shoulder belt mounted on the car, at its front surface.

According to still another embodiment of the present invention, the V-shaped shield structure is rotatably connected to the seat body so as to be able to be displaced between a closed position and an opened position. The body of the child is restrained in the closed position. The front of the seat body is opened to put the child on the seat or bring the child out of the seat in the opened position. According to this embodiment, the child car seat comprises an elastic member which always forces the V-shaped shield structure toward the opened state.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
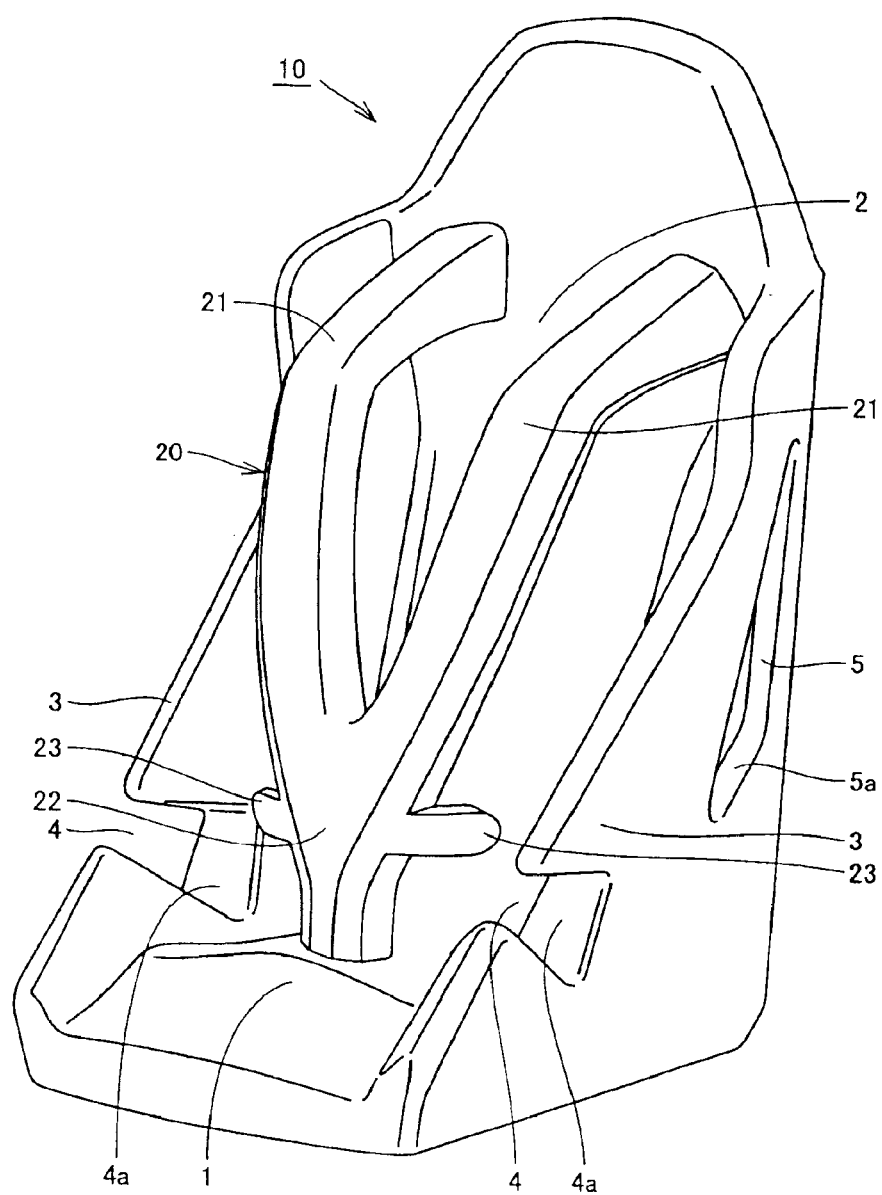
FIG. 1 is a perspective view showing an embodiment of the present invention.
Figure 2:
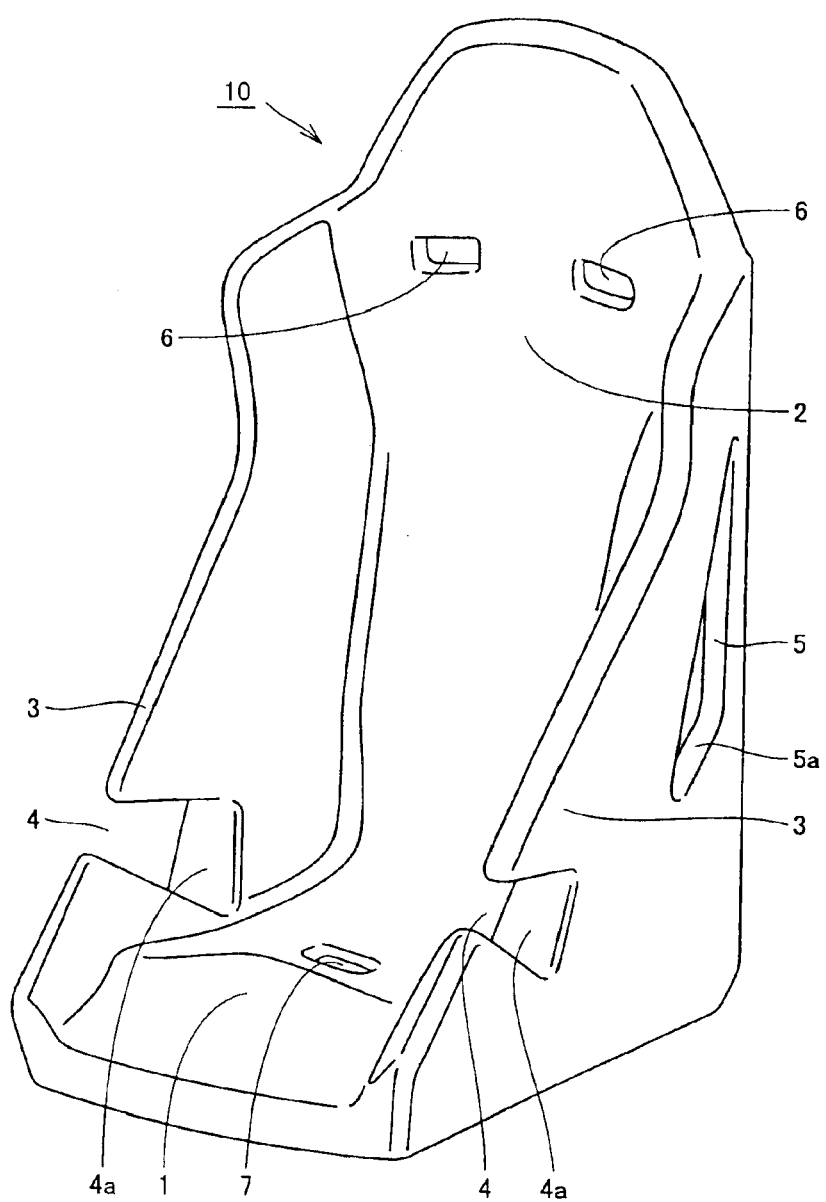
FIG. 2 is a perspective view showing a state in which a V-shaped shield structure is removed.
Figure 3:
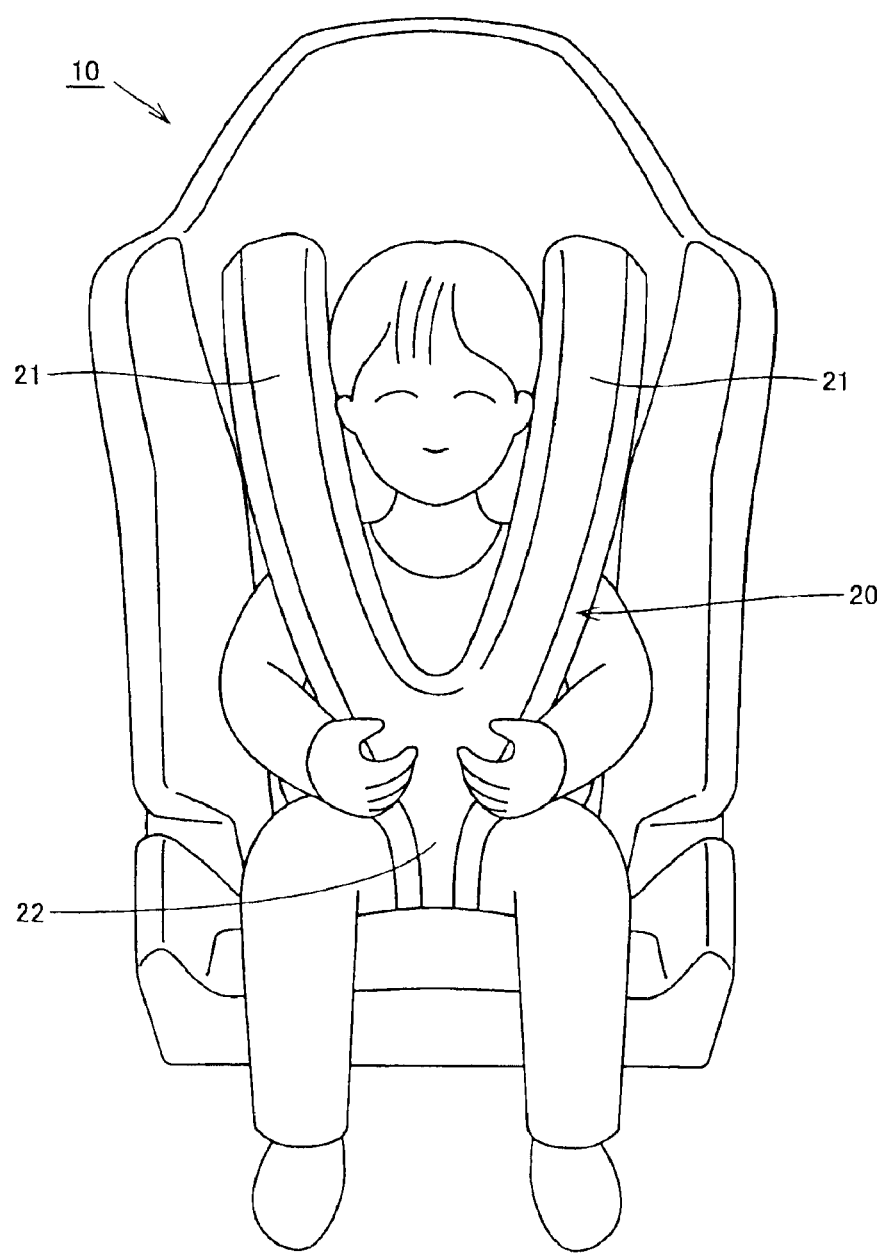
FIG. 3 is a front view showing a state in which a child is seated.

A child car seat 10 shown in FIGS. 1 to 3 belongs to a category of a juvenile seat for children from 9 months old to a school age. It comprises a seat body and a V-shaped shield structure 20. The seat body comprises a seat wall 1, a backrest wall 2, and a pair of side walls 3 forwardly extending from both sides of the backrest wall. According to an illustrated embodiment, the pair of side walls 3 integrally extends from the seat wall 1 and the backrest wall 2.

Each of the side walls 3 has a notch 4 (forward notch) at a forward portion and an opening 5 (backward opening) at a backward portion. The child car seat 10 is fixed to a car seat by passing a seat belt mounted on a car through the forward notch 4 or the backward opening 5.

While a child weighs 9 kg (about 9 months old) to 18 kg (up to 4 years old), as shown in FIG. 3, the V-shaped shield structure 20 is installed. In this case, the seat belt mounted on a car is put through the backward opening 5, and a bottom wall 5a of the backward opening 5 becomes a belt supporting surface.

While the child weighs 15 kg to 36 kg (about 11 years old), as shown in FIG. 2, the V-shaped shield structure 20 is removed. In this case, the seat belt mounted on the car is put through the forward notch 4, and a bottom wall 4a of the forward notch 4 becomes a belt supporting surface.

As can be seen from FIG. 2, bolt through-holes 6 are provided at an upper region of the backrest wall 2 of the seat body and a buckle receiving hole 7 is provided at a forward region of the seat wall 1. These features will be described in detail later.

As shown in FIGS. 1 and 3, the V-shaped shield structure 20 extends from above both shoulders to a crotch of a child. More specifically, the V-shaped shield structure 20 includes a pair of vertical bars 21 extending over the both shoulders of the child and a connection part 22 for connecting the lower ends of the pair of vertical bars 21. According to the illustrated embodiment of the present invention, the V-shaped shield structure 20 further includes a pair of side projections 23 projecting toward a waist part of the child seated. The side projections 23 fix the position of the waist part of the child seated.

Figure 4:
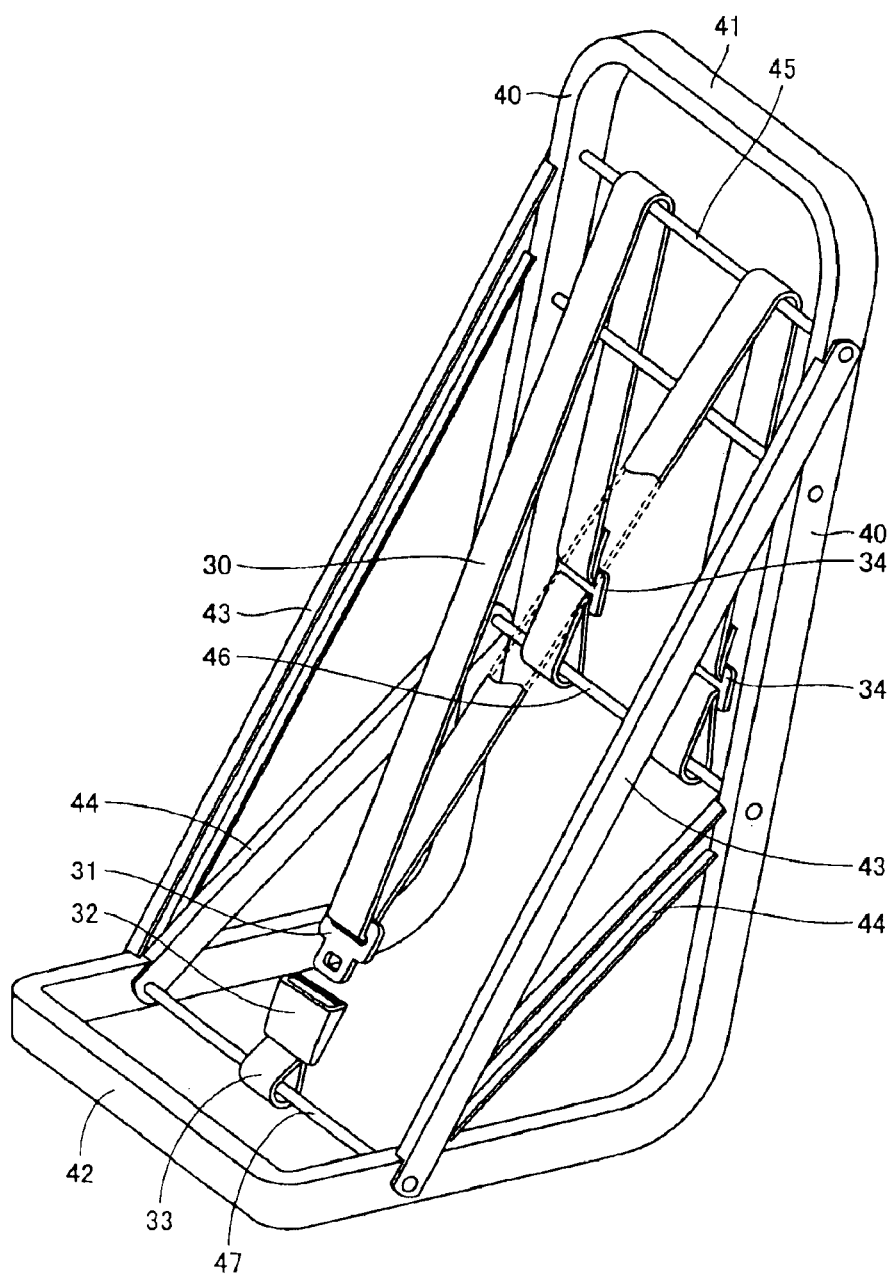
FIG. 4 is a perspective view showing a connecting state between a frame assembly and a belt.
Figure 5:
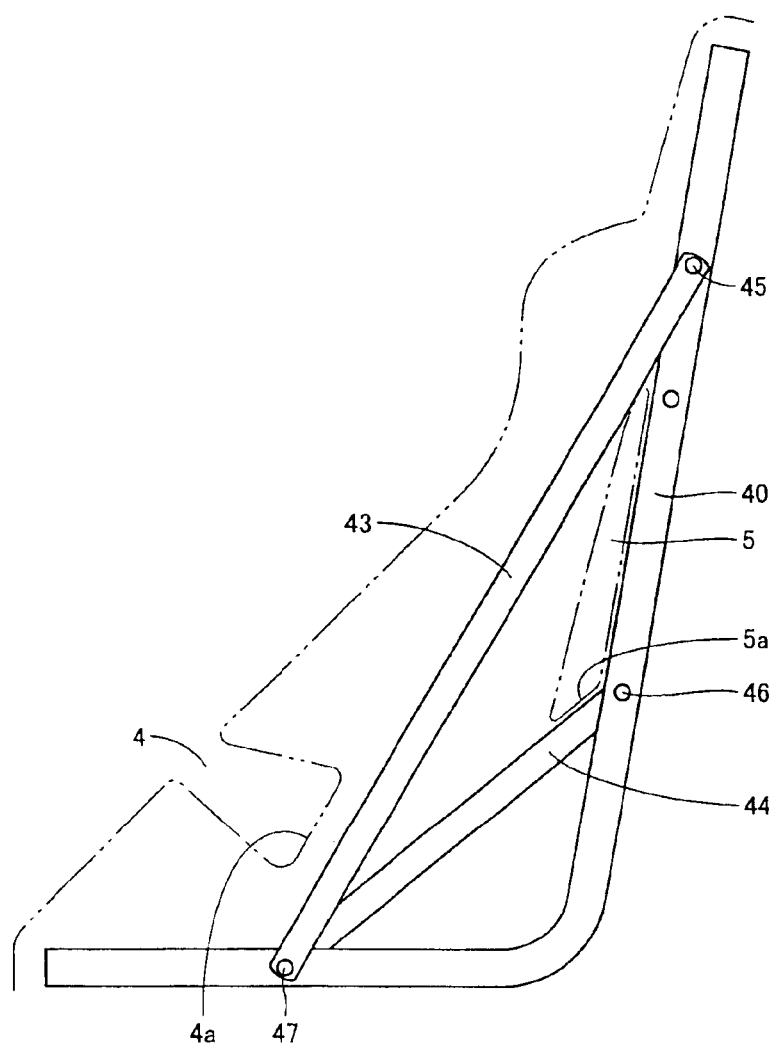
FIG. 5 is a side view showing the frame assembly.

As shown in FIGS. 4 and 5, the child car seat comprises a frame assembly for supporting the seat body. The frame assembly includes a pair of L-shaped frames 40 extending along both sides of the backrest wall 2 and the seat wall 1 of the seat body, an upper end connecting frame 41 for connecting upper ends of the pair of L-shaped frames 40, a front end connecting frame 42 for connecting front ends of the pair of L-shaped frames 40, an upper reinforcement frame 43 and a lower reinforcement frame 44 for connecting an extending part in the vertical direction to an extending part in the horizontal direction of the L-shaped frame 40, an upper connection metal rod 45 for connecting upper portions of the pair of L-shaped frames 40, a lower connection metal rod 46 for connecting lower portions of the pair of L-shaped frames 40, and a front connection metal rod 47 for connecting front portions of the pair of L-shaped frames 40.

Figure 6:
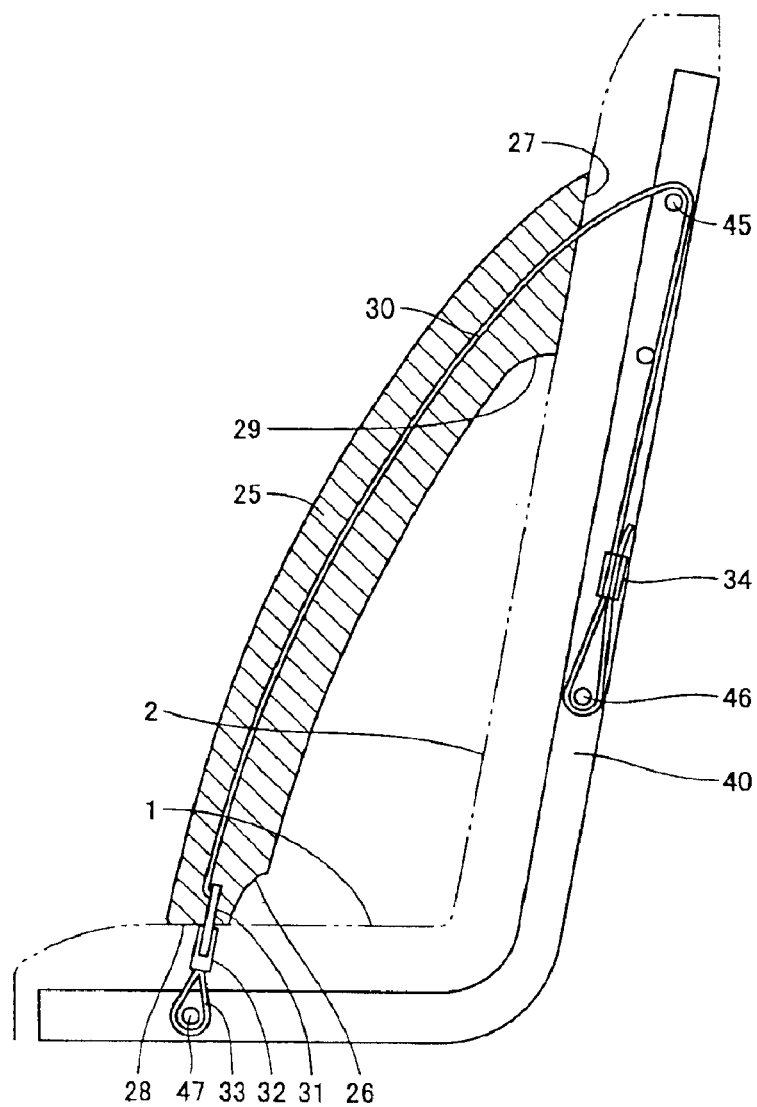
FIG. 6 is a side view showing a structure in which the V-shaped shield structure is mounted on a seat body.
Figure 7:
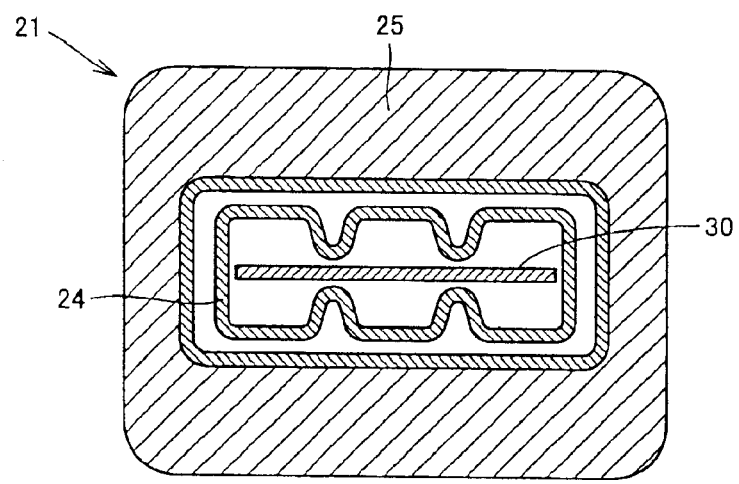
FIG. 7 is a transverse sectional view showing a vertical bar of the V-shaped shield structure.

As shown in FIGS. 4, 6 and 7, the V-shaped shield structure 20 comprises a belt 30 extending in the shape of the letter V, a belt guiding member 24 for guiding the belt 30, and an elastic cover 25 surrounding the belt guiding member 24. The belt guiding member is not shown in FIG. 6.

As can be seen from FIG. 4, the belt 30 extending in the shape of the letter V includes an insert clip 31 at a central portion, that is, an edge portion of the V shape. A receive clip 32 is mounted on the front connection rod 47 of the frame assembly through a base belt 33. The V-shaped belt 30 is locked in a fixed state by engaging the insert clip 31 with the receive clip 32. The receive clip 32 is made so as to be fit into the buckle receiving hole 7 of the seat wall 1 shown in FIG. 2.

The V-shaped belt 30 is guided to behind the seat body through the through-holes 6 of the backrest wall 2 shown in FIG. 2. As shown in FIG. 4, the V-shaped belt 30 winds around the upper and lower connection metal rods 45 and 46 of the frame assembly and then, it is fixed by a fixing member 34. For example, in the event of a crash at the front of a car, an impact load forwardly affects the upper connection rod 45 through the belt 30. At this time, the upper connection metal rod 45 deforms in a plastic manner to absorb the impact force to some extent.

Description will be made of a sectional structure of the V-shaped shield structure 20 with reference to FIG. 7. The belt guiding member 24 is preferably formed of blow-molded resin. In addition, the elastic cover 25 is preferably formed of bead foam which is elastic and can absorb small impact force. Such sectional structure is employed to the vertical bars 21 and the connection part 22 of the V-shaped shield structure 20. The side projection 23 of the V-shaped shield structure 20 is formed of only the bead foam, for example.

The belt 30, the belt guiding member 24 and the elastic cover 25 are each made of a material which can be cut by a knife or a cutter. Therefore, in case of an emergency, even if the insert clip 31 and the receive clip 32 could not be isolated, it is possible to make the child escape by cutting the V-shaped shield structure 20 with a knife or a cutter, which is preferable in view of safety.

Figure 8:
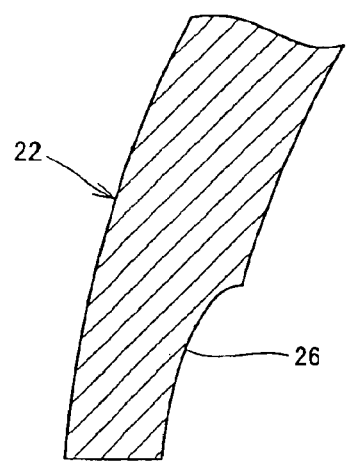
FIG. 8 is a sectional view showing a lower portion of a connection part of the V-shaped shield structure.
Figure 9:
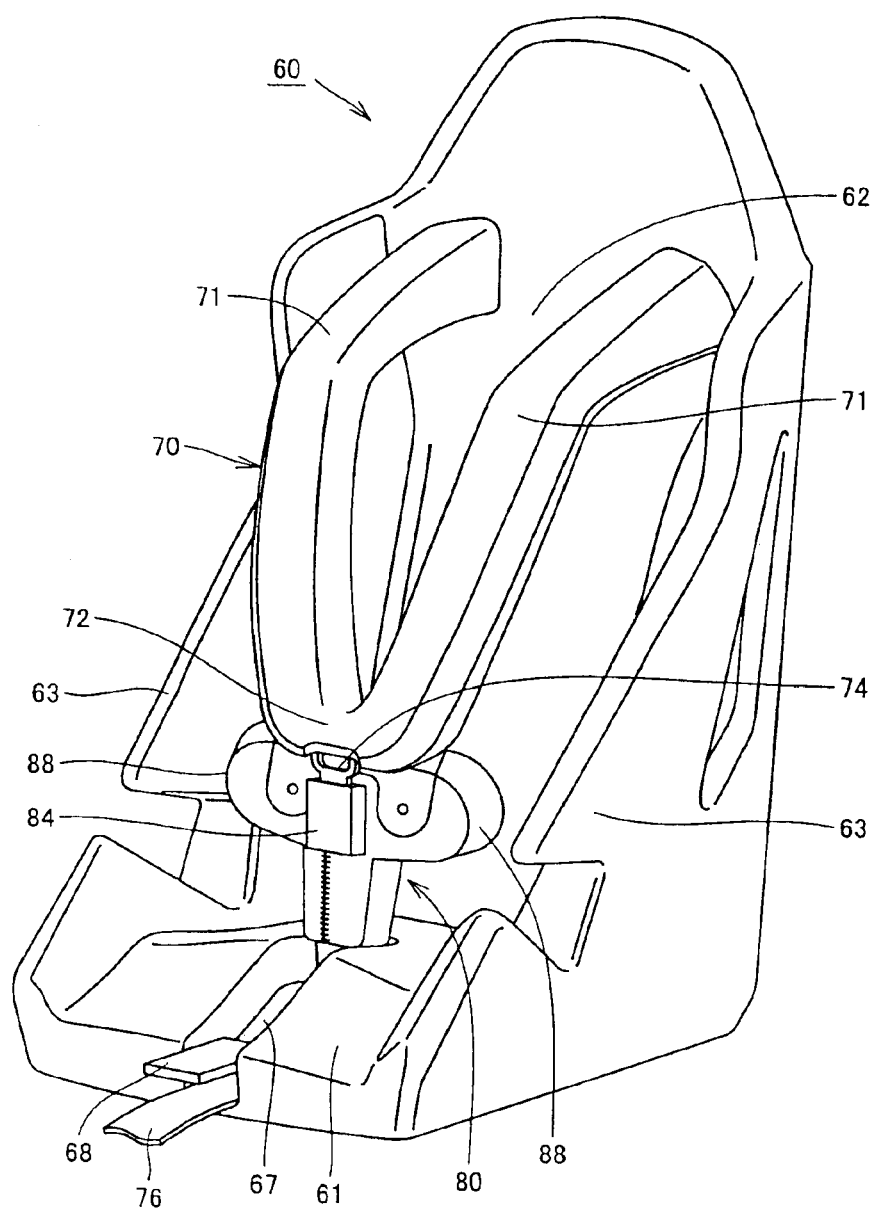
FIG. 9 is a perspective view showing another embodiment of the present invention.

As shown in FIG. 8, a concave portion 26 is formed at a lower part of the connection part 22 of the V-shaped shield structure 20 so as not to press against a vital, i.e. genital, zone of a boy seated in the child car seat 10.

As shown in FIG. 6, the elastic cover 25 of the V-shaped shield structure 20 comprises a back surface abutting part 27 abutting on the backrest wall 2 of the seat body, a seat surface abutting part 28 abutting on the seat wall 1 and a shoulder protector part 29 extending in the horizontal direction over both shoulders of the child seated in the seat body. According to the illustrated embodiment, while the back surface abutting part 27 and the backrest wall 2 are always kept in a connecting state, the seat surface abutting part 28 can be separated from the seat wall 1.

While the insert clip 31 mounted on the belt 30 extending in the shape of the letter V engages with the receive clip 32 connected to the front connection rod 47, the back surface abutting part 27 is in surface contact with the backrest wall 2 and the seat surface abutting part 28 is in surface contact with the seat wall 1. Therefore, the posture and position of the V-shaped shield structure 20 is fixed.

Since the shoulder protector part 29 of the elastic cover 25 extends almost in the horizontal direction over both shoulders of the child seated in the car seat, when the child moves upwardly because of an impact, it works so as to fixedly hold both shoulders while reducing the impact to both shoulders. Furthermore, since the V-shaped shield structure 20 does not tightly restrain both shoulders of the child, the shoulder protector part 29 is positioned over both shoulders of the child with a space.

According to a conventional juvenile seat equipped with a shield member, a position of the shield member is considerably higher than shoulders of a baby. Therefore, movement of both hands of the baby is sometimes limited by it. Meanwhile, as shown in FIG. 3, if the V-shaped shield structure 20 is provided, the movement of both hands is relatively free.

Description will be made of mechanisms of the upper and lower reinforcement frames 43 and 44 of the frame assembly with reference to FIG. 5. Needless to say, the upper and lower reinforcement frames 43 and 44 function to fix a configuration of the pair of L-shaped frames of the frame assembly. In addition to the above, according to the illustrated embodiment, the upper reinforcement frame 43 works so as to support the belt supporting surface 4a provided in the forward notch 4 in each side wall 3 of the seat body from beneath, and the lower reinforcement frame 44 works so as to support the belt supporting surface 5a provided in the backward opening 5 in each side wall of the seat body from beneath.

Since the V-shaped shield structure 20 has a rigid structure which extends from above both shoulders to a crotch of the child seated in the seat body, it can effectively prevent the child from getting out forwardly or upwardly. In addition, in the event of a crash on the side of a car, the V-shaped shield structure 20 also effectively prevents the head of the child from moving to the side. Furthermore, since it has a rigid structure, there is no risk in which the head of the child seated passes through the vertical bar 21 of the V-shaped shield structure 20.

If the child grows to weigh 15 kg or so, the V-shaped shield structure 20 is to be removed as shown in FIG. 2. The V-shaped shield structure 20 can be easily removed by separating the belt 30 from the fixing member 34 (referring to FIG. 4).

Although the embodiment of the present invention was described with reference to FIGS. 1 to 8, various changes can be added to this embodiment. Some of them will be illustratively described hereinafter.

Although the V-shaped shield structure has the belt passed through inside according to the illustrated embodiment, it may not have the belt. For example, the V-shaped shield structure may be formed of a rigid material such as metal or resin. In this case also, an elastic cover is preferably mounted on its surface in order to give the child a soft touch.

Furthermore, the V-shaped shield structure is provided such that it always keeps abutting on the backrest wall of the seat body and it can be separated from the seat wall according to the illustrated embodiment. As its variation, a reversed structure is possible, that is, it always keeps abutting on the seat wall and can be separated from the backrest wall. Alternatively, the whole of the V-shaped shield structure may be detachable to the seat body.

FIGS. 9 to 15 show another embodiment of the present invention.

An illustrated child car seat 60 comprises a seat body, a V-shaped shield structure 70, and a crotch pad 80. The seat body comprises a seat wall 61, a backrest wall 62 and side walls 63. A lower end of the V-shaped shield structure 70 is detachably connected to the crotch pad 80 through a buckle.

As shown in the figures, the crotch pad 80 upwardly extends from the seat wall 61 of the seat body over a crotch of a child. The crotch pad 80 comprises a pair of side projections 88 which project toward a waist part of the child seated in the seat body. A groove 67 extending from a front end to the inside is formed in the seat wall 61 of the seat body and the crotch pad 80 is detachably mounted on this groove part.

Figure 10:
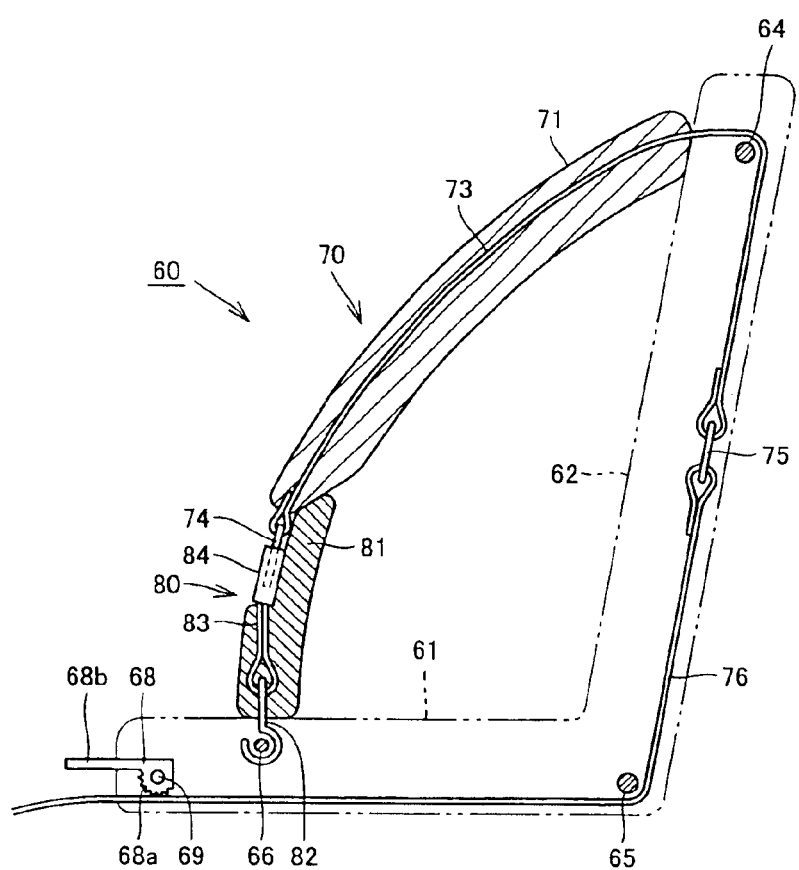
FIG. 10 is a sectional view showing a substantial part of the embodiment shown in FIG. 9.
Figure 11:
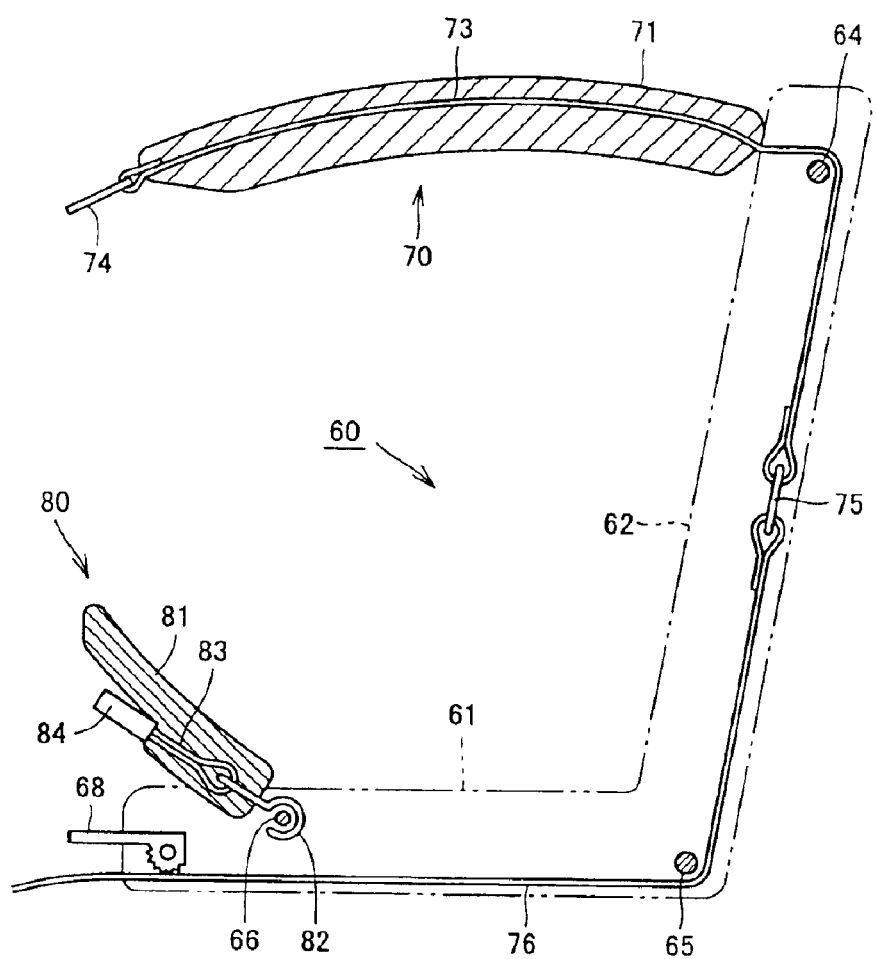
FIG. 11 is a view showing a state in which the V-shaped shield structure is upwardly rotated from the state shown in FIG. 10.

As can be seen from FIGS. 10 and 11, the crotch pad 80 comprises a mounting cup 82 engaging with a front horizontal shaft 66 fixed to the seat wall 61 of the seat body, a crotch belt 83 upwardly extending from the mounting clip 82, a receive clip 84 mounted on an end of the crotch belt 83 and a cushion member 81 disposed along the crotch belt 83 and the receive clip 84. Since the mounting clip 82 has a hook shape, it car be detached from the front horizontal shaft 66 by performing a predetermined operation. In addition, if the crotch pad 80 is disconnected from the V-shaped shield structure 70, then the crotch pad 80 can freely turn around the front horizontal shaft 66.

The V-shaped shield structure 70 comprises a pair of vertical bars 71 and a connection part 72 for connecting lower ends of the pair of vertical bars 71.

Figure 12:
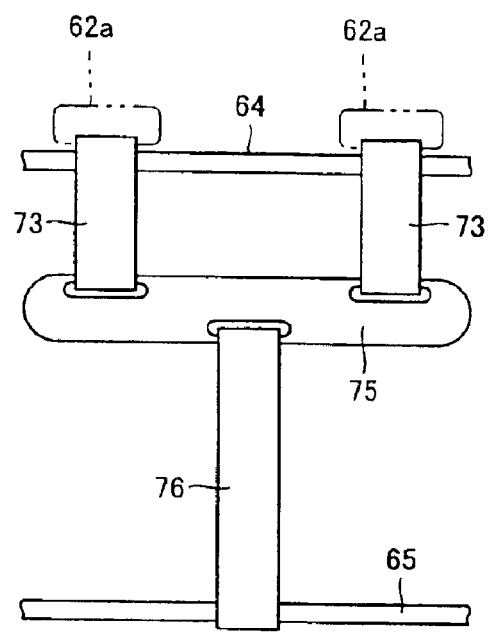
FIG. 12 is a view showing a part on the back surface side of the embodiment shown in FIG. 9.

A shield belt 73 having an insert clip 74 passes through the V-shaped shield structure 70. The insert clip 74 detachably engages with a receive clip 84 of the crotch pad 80. As shown in FIG. 12, a backward part of the shield belt 73 extending in the shape of the letter V passes through-holes 62a in the backrest wall 62 of the seat body, turns around an upper horizontal shaft 64 of the seat body, downwardly extends along a back surface of the backrest wall and is connected to a junction plate 75.

One extension belt 76 is connected to the junction plate 75. The extension belt 76 turns around a lower horizontal shaft 65 of the seat body, forwardly extends along the seat wall 61 and is drawn out from the front end of the seat wall 61.

A lock member 68 for prohibiting the movement of the extension belt 76 is provided at the front end of the seat wall 61 of the seat body. The lock member 68 is rotatably mounted on the seat wall 61 through a shaft 69 and comprises a cam part 68a engaging with the extension belt 76 and an operating part 68b which is turned by a finger.

FIG. 10 shows a state in which the child seated in the seat body is restrained. In this state, the V-shaped shield structure 70 and the crotch pad 80 are connected and the movement of the extension belt 76 is prohibited by the lock member 68.

When the child is to be brought out of the seat body or to be seated in the seat body, as shown in FIG. 11, the V-shaped shield structure 70 disengages from the crotch pad 80 and both are separated. At this time, when the extension belt 76 which was forwardly drawn out of the seat wall 61 of the seat body is further drawn out, the V-shaped shield structure 70 is pulled by the extension belt 76 and largely rotated in the upward direction. In this state, if the movement of the extension belt 76 is prohibited by the lock member 68, the V-shaped shield structure can be kept in an opened state as shown in FIG. 11.

The crotch pad 80 can freely turn around the front horizontal shaft 66 of the seat body. Therefore, as shown in FIG. 11, as the crotch pad 80 is forwardly brought down, it is easy to bring the child out of the seat or put the child in the seat.

When the child grows up, the V-shaped shield structure 70 and the crotch pad 80 are removed from the seat body. In this case, the seated child is restrained by using a seat belt mounted on the car.

Figure 13:
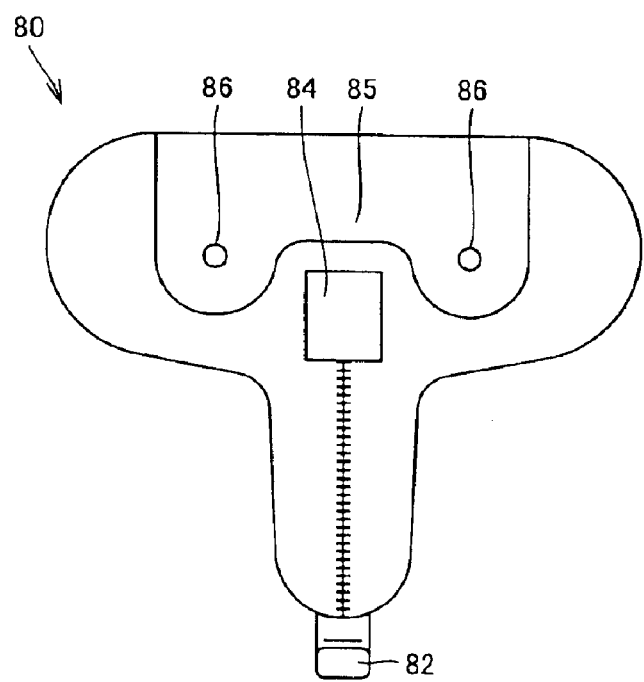
FIG. 13 is a front view showing a crotch pad.
Figure 14:
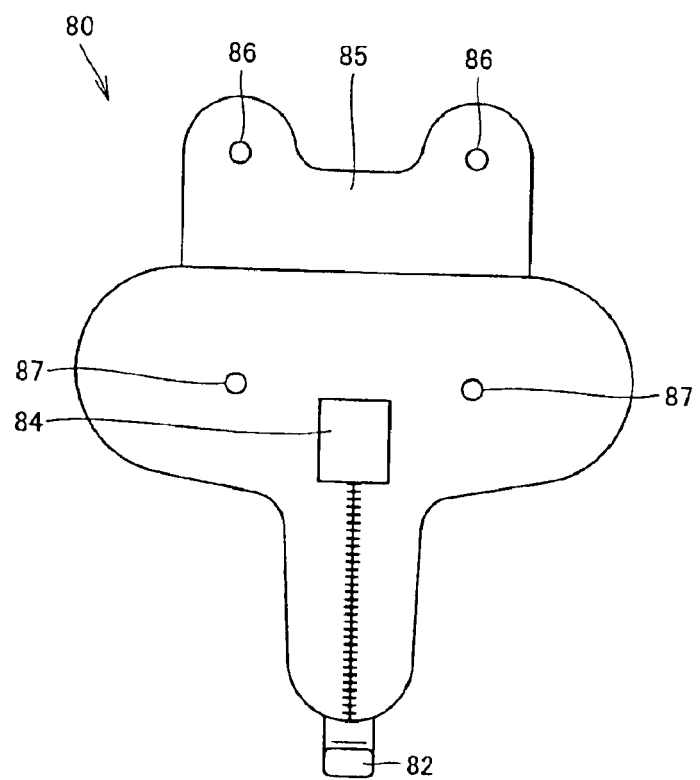
FIG. 14 is a view showing a state in which a shoulder belt guiding flap of the crotch pad is opened.

Although the V-shaped shield structure 70 is removed from the seat body in the growing process of the child, the crotch pad 80 may remain being mounted on the seat body. To provide facilities for such usage, the crotch pad 80 has a shoulder belt guiding flap 85 as shown in FIGS. 13 and 14. The shoulder belt guiding flap 85 is formed of a sewn cloth, for example and fixed to an outer surface of the crotch pad 80 by engagement of a male button 86 and a female button 87.

Figure 15:
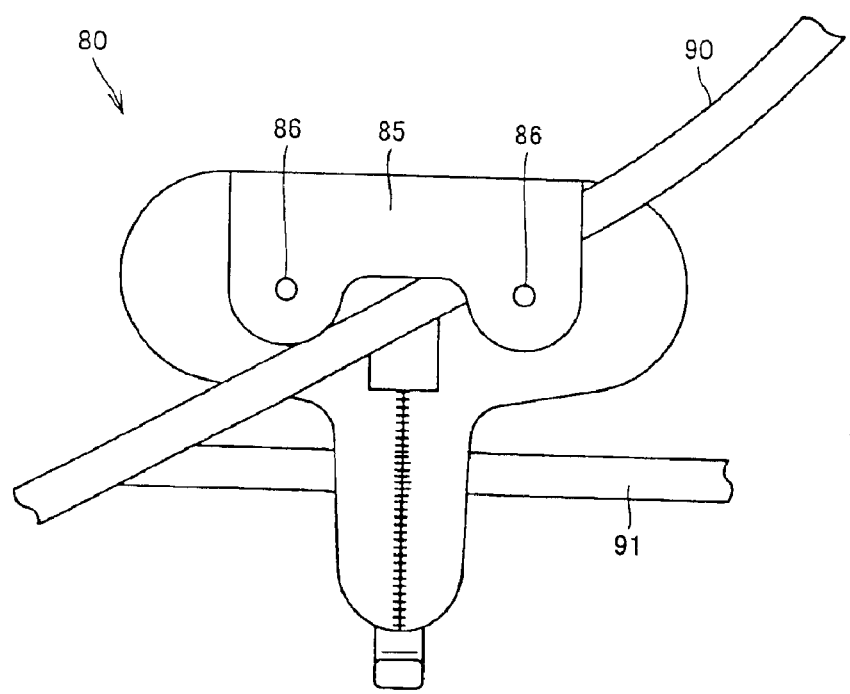
FIG. 15 is a view showing a state in which a shoulder belt mounted on a car passes through the shoulder belt guiding flap.

As shown in FIG. 15, while a waist belt 91 of the seat belt mounted on the car directly goes through an abdominal area of the child, a shoulder belt 90 is guided by the shoulder belt guiding flap 85. As the shoulder belt passes through the shoulder belt guiding flap 85 in this way, the shoulder belt is prevented from getting stuck with a neck of the child.

According to the illustrated embodiment of the present invention, the V-shaped shield structure is rotatably connected to the seat body so as to be able to be displaced between a closed position and an opened position. In this case, as an example, the child car seat may be provided with an elastic member which always forces the V-shaped shield structure toward the opened position.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A child car seat adapted to have a child seated therein, said child car seat comprising:
   a seat body including a seat wall and a backrest wall; and
   a V-shaped shield structure configured and arranged so as to be adapted to extend downwardly from above bath shoulders of the child so as to restrain a body of the a child when the child is seated in said seat body;
   wherein said V-shaped shield structure includes a belt extending in the shape of the letter V, a belt guiding member guiding said belt, and an elastic cover surrounding said belt guiding member.

2. The child car seat according to claim 1, wherein said V-shaped shield structure is configured and arranged so as to be adapted to extend down to a crotch of the child when the child is seated in said seat body.

3. The child car seat according to claim 2, wherein said V-shaped shield structure includes a back surface abutting part which is kept connected to said backrest wall of said seat body and a neat surface abutting part which can be separated from said seat wall, and further comprising a buckle detachably connecting said seat surface abutting part of said V-shaped shield structure to said seat wall of said seat body.

4. The child car seat according to claim 1, wherein said elastic cover includes a shoulder protector part configured and arranged so as to be adapted to extend in an almost horizontal direction over both shoulders of the child when the child is seated in said seat body.

5. The child car seat according to claim 1, wherein said elastic cover includes a pair of side projections configured and arranged so as to be adapted to project toward a waist part of the child when the child is seated in said seat body.

6. The child car seat according to claim 1, wherein said elastic cover has a concave portion located so as to be adapted to be adjacent to a genital zone of the child when the child is seated in said seat body.

7. The child car seat according to claim 1, wherein said elastic cover is formed of bead foam.

8. The child car seat according to claim 1, wherein said belt guiding member is formed of blow-molded resin.

9. The child car seat according to claim 1, further comprising a frame assembly supporting said seat body, wherein said frame assembly includes a pair of L-shaped frames extending along both sides of said backrest wall and said seat wall of said seat body, an upper connection rod connecting upper portions of said pair of L-shaped frames with one another, and a lower connection rod connecting lower portions of said pair of L-shaped frames with one another, and wherein said belt extending in the shape of the letter V winds around said upper connection rod and is connected to said lower connection rod.

10. The child car seat according to claim 1, further comprising a crotch pad upwardly extending from said seat wall of said seat body to a position adapted to be adjacent to a crotch of the child when the child is seated in said seat body, and a buckle detachably connecting a lower end of said V-shaped shield structure to said crotch pad.

11. The child car seat according to claim 10, wherein said crotch pad includes a pair of side projections configured and arranged so as to be adapted to project toward a waist part of the child when the child is seated in said seat body.

12. The child car seat according to claim 10, further comprising a connecting device detachably connecting said crotch pad to said seat wall of said seat body.

13. The child car seat according to claim 10, further adapted to be arranged in a car, wherein said crotch pad comprises, on a front surface thereof, a shoulder belt guide device adapted to guide a shoulder belt mounted on the car when said car seat is arranged in the car.

14. The child car seat according to claim 1, further comprising a crotch belt upwardly extending from said seat wall of said seat body to a position adapted to be adjacent to a crotch of the child when the child is seated in said seat body, and a buckle detachably connecting a lower end of said V-shaped shield structure to said crotch belt.

15. The child car seat according to claim 1, further comprising a belt connected to said V-shaped shield structure, passing a back surface of said backrest wall and said seat wall of said seat body, and drawn out to a front end of said seat wall, and a lock member that is provided at said front end of said seat wall, and that selectively prohibits movement of said belt.

16. The child car seat according to claim 1, wherein said V-shaped shield structure is rotatably connected to said seat body so as to be able to be displaced between a closed position and an opened position, and said child car seat further comprises an elastic member which always urges said V-shaped shield structure toward said opened position.

17. A child car seat adapted to have a child seated therein, said child car seat comprising:

a seat body including a seat wall and a backrest wall; and a V-shaped shield structure configured and arranged so as to be adapted to extend downwardly from above both shoulders of the child so as to restrain a body of the child when the child is seated in said seat body;

wherein said seat body further includes a pair of side walls forwardly extending from both sides of said backrest wall, each one of said side walls has a notch at a forward portion thereof and an opening at a backward portion thereof, and said child car seat is adapted to be arranged in a car such that a seat belt mounted on the car passes through said notch or said opening.

18. The child car seat according to claim 17, further comprising a frame assembly supporting said seat body, wherein:

said frame assembly includes a pair of L-shaped frames that extend along both sides of said backrest wall and said seat wall of said seat body and that each includes a vertically extending part and a horizontally extending part, and upper and lower reinforcement frames connecting said vertically extending part to said horizontally extending part of each said L-shaped frame, said upper reinforcement frame supports a belt supporting surface provided in said notch of each said side wall from beneath, and said lower reinforcement frame supports a belt supporting surface provided in said opening of each said side wall from beneath.

* * * * *

UNITED STATES PATENT AND TRADEMARK OFFICE
CERTIFICATE OF CORRECTION

PATENT NO. : 6,893,088 B2
DATED : May 17, 2005
INVENTOR(S) : Kassai et al.

It is certified that error appears in the above-identified patent and that said Letters Patent is hereby corrected as shown below:

Title page,
Item [56], References Cited, FOREIGN PATENT DOCUMENTS, please replace "DE 40338648" with -- DE 4033848 --.

Column 2,
Line 12, after "impact to" replace "then" with -- them --.
Line 19, after "vital or" replace "genitel" with -- genital --.

Column 3,
Line 12, after "According to" replace "A" with -- a --.

Column 4,
Line 37, after "FIG. 2," replace "bolt" with -- belt --.

Column 8,
Line 34, after "above" replace "bath" with -- both --.
Line 35, after "body of the" delete "a".
Line 48, after "body and a" replace "neat" with -- seat --.

Signed and Sealed this

Sixteenth Day of August, 2005

JON W. DUDAS
*Director of the United States Patent and Trademark Office*